(12) United States Patent
Schilling et al.

(10) Patent No.: US 11,266,064 B2
(45) Date of Patent: Mar. 8, 2022

(54) DISTRIBUTION AND LEVELING SYSTEM FOR AN AGRICULTURAL PRODUCT STORAGE COMPARTMENT

(71) Applicant: CNH Industrial Canada, Ltd., Saskatoon (CA)

(72) Inventors: Robin Bruno Schilling, Darfield (CA); Martin J. Roberge, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 400 days.

(21) Appl. No.: 16/265,428

(22) Filed: Feb. 1, 2019

(65) Prior Publication Data
US 2020/0245535 A1 Aug. 6, 2020

(51) Int. Cl.
*B22C 5/00* (2006.01)
*A01C 15/00* (2006.01)
(Continued)

(52) U.S. Cl.
CPC ........ *A01C 15/005* (2013.01); *B01F 7/00316* (2013.01); *B01F 7/00416* (2013.01);
(Continued)

(58) Field of Classification Search
CPC ..... A01C 17/008; A01C 15/005; A01C 15/04; A01C 7/04; B01F 2015/00642; B01F 2215/0013
See application file for complete search history.

(56) References Cited

U.S. PATENT DOCUMENTS 5,354,127 A * 10/1994 Del Zotto ............... B01F 7/087
366/186
6,854,405 B2   2/2005 Memory
(Continued)

FOREIGN PATENT DOCUMENTS

CA   2905309 A1 *  5/2016  ........... F16K 1/2007
EP   2832208        2/2015
(Continued)

OTHER PUBLICATIONS

Google machine translation for "KR-20080098869-A" (Year: 2008).*
U.S. Appl. No. 15/884,056, filed Jan. 30, 2018, Forrest et al.

*Primary Examiner* — Anshu Bhatia
*Assistant Examiner* — Gregory Y Huan
(74) *Attorney, Agent, or Firm* — Rebecca L. Henkel; Rickard K. DeMille

(57) ABSTRACT

A distribution and leveling system for a particulate material storage compartment includes an auger configured to be disposed within the particulate material storage compartment. The auger is configured to move particulate material across the particulate material storage compartment via rotation of the auger about a first rotational axis. The distribution and leveling system also includes an agitator positioned below the auger. The agitator is configured to agitate the particulate material via rotation of the agitator about a second rotational axis. In addition, the first rotational axis is substantially parallel to the second rotational axis, rotation of the auger and rotation of the agitator are independently controllable, and the first rotational axis and the second rotational axis are substantially aligned with one another along a longitudinal axis of the particulate material storage compartment.

19 Claims, 7 Drawing Sheets

(51) Int. Cl.
    *B01F 7/00*         (2006.01)
    *B01F 7/04*         (2006.01)
    *B01F 15/00*       (2006.01)
    *B01F 13/10*       (2006.01)
    *B01F 7/08*         (2006.01)
    *A01C 7/04*        (2006.01)

(52) U.S. Cl.
    CPC .................. *B01F 7/04* (2013.01); *B01F 7/08* (2013.01); *B01F 13/1002* (2013.01); *B01F 15/00389* (2013.01); *A01C 7/04* (2013.01); *B01F 2015/00642* (2013.01); *B01F 2215/0013* (2013.01)

(56) References Cited

U.S. PATENT DOCUMENTS

| | | | |
|---|---|---|---|
| 9,578,800 B2 | 2/2017 | Beaujot et al. | |
| 2007/0034642 A1* | 2/2007 | Pendleton | B65G 53/36 |
| | | | 222/56 |
| 2008/0095910 A1* | 4/2008 | Wenger | B01F 7/00425 |
| | | | 426/557 |

FOREIGN PATENT DOCUMENTS

| | | | |
|---|---|---|---|
| FR | 2321830 | | 3/1977 |
| KR | 20080098869 A | * | 11/2008 |
| KR | 20100079818 | | 7/2010 |
| WO | 2017195924 | | 11/2017 |

\* cited by examiner

DISTRIBUTION AND LEVELING SYSTEM FOR AN AGRICULTURAL PRODUCT STORAGE COMPARTMENT

BACKGROUND

The present disclosure relates generally to a distribution and leveling system for an agricultural product storage compartment.

Generally, agricultural implements are towed behind a work vehicle, such as a tractor. The agricultural implement may include multiple rows of ground engaging opener assemblies to excavate trenches into soil for depositing a particulate material, such as seeds or fertilizer. An air cart may be towed behind or in front of the agricultural implement and configured to provide the particulate material to the ground engaging opener assemblies. In this manner, rows of the particulate material may be deposited into the soil. Some particulate material (e.g., wheat seeds, fertilizer, etc.) may be deposited into the soil in large quantities. Accordingly, the particulate material may be stored in larger primary storage compartments. Further, some particulate material (e.g., canola seed, inoculants, etc.) may be deposited into the soil in small quantities. Accordingly, such particulate material may be stored in a smaller secondary storage compartment of the air cart.

Each primary storage compartment may include a tapered portion configured to direct the particulate material to a respective metering system. Each metering system, in turn, controls flow of the particulate material to the ground engaging opener assemblies of the agricultural implement. The secondary storage compartment may be positioned within a space between the tapered portions of adjacent primary storage compartments to efficiently utilize the available space within the air cart. However, positioning the secondary storage compartment between the tapered portions of adjacent primary storage compartments blocks access to the top of the secondary storage compartment. Accordingly, the secondary storage compartment may not be loaded from the top. Moreover, loading the secondary storage compartment from the side may cause the particulate material to be unevenly distributed within the secondary storage compartment. As a result, portions of a metering system positioned below the secondary storage compartment may not receive particulate material, thereby causing the particulate material to be unevenly distributed throughout the field.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the claimed subject matter. Indeed, the claimed subject matter may encompass a variety of forms that may be similar to or different from the embodiments set forth below.

In certain embodiments, a distribution and leveling system for a particulate material storage compartment includes an auger configured to be disposed within the particulate material storage compartment. The auger is configured to move particulate material across the particulate material storage compartment via rotation of the auger about a first rotational axis. The distribution and leveling system also includes an agitator positioned below the auger. The agitator is configured to agitate the particulate material via rotation of the agitator about a second rotational axis. In addition, the first rotational axis is substantially parallel to the second rotational axis, rotation of the auger and rotation of the agitator are independently controllable, and the first rotational axis and the second rotational axis are substantially aligned with one another along a longitudinal axis of the particulate material storage compartment.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
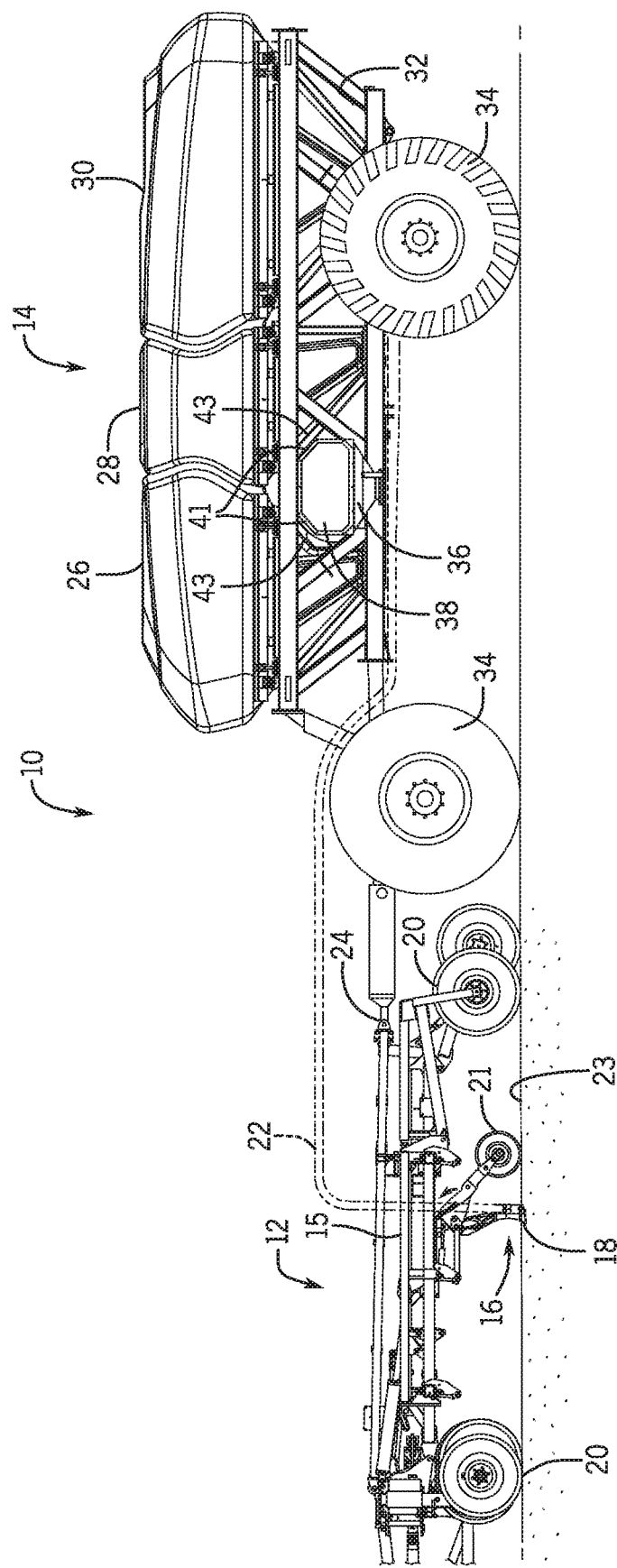
FIG. 1 is a side view of an embodiment of an agricultural system having an implement and an air cart.

FIG. 1 is a side view of an embodiment of an agricultural system 10 having an agricultural implement 12 and an air cart 14. In the illustrated embodiment, the agricultural implement 12 includes a tool frame 15, and a row unit 16, which includes an opener 18, is coupled to the tool frame 15. As illustrated, wheel assemblies 20 are also coupled to the tool frame 15. The agricultural implement 12 may be pulled through a field by a work vehicle (e.g., a tractor), and the agricultural implement 12 may deposit rows of particulate material (e.g., seed, fertilizer, inoculant, etc.) into the soil as the agricultural implement 12 traverses the field. The wheel assemblies 20 contact the soil surface and enable the agricultural implement 12 to be pulled by the work vehicle, and the row unit 16 may deposit one row of the particulate material into the soil. Although only one row unit 16 is shown coupled to the tool frame 15 for clarity, the agricultural implement 12 may include multiple row units 16 (e.g., organized in one or more rows across the agricultural implement 12). In some embodiments, the agricultural implement 12 may include 12, 14, 16, 18, 20, or more row units 16, each of which may deposit particulate material into the soil to form a respective row.

To facilitate depositing the particulate material within the soil, each row unit 16 includes the opener 18. In response to movement of the row unit 16 through the field, the opener 18 exerts a force onto the soil 23, thereby excavating a trench within the soil 23. As the agricultural implement 12 moves through the field, the row unit 16 may deposit the particulate material into the excavated trench (e.g., via a seed tube). Then, a press wheel 21 of the row unit may pack soil onto the deposited particulate material.

In the illustrated embodiment, the air cart 14 pneumatically distributes the particulate material to the row unit 16 via a distribution hose 22. The air cart 14 may include a metering system configured to control the particulate material flow rate to the distribution hose 22, and an air source may provide an airflow through the distribution hose 22. The airflow may interact with the particulate material flowing into the distribution hose 22 from the metering system, thereby fluidizing the particulate material and forming an air/particulate material mixture. The distribution hose 22 is configured to transport the air/particulate material mixture to the row unit 16, thereby providing the row unit with a metered flow of the particulate material. The air cart 12 may supply particulate material to multiple row units 16 (e.g., via one or more distribution hoses 22). As such, the metering system of the air cart 12, which is coupled to the one or more distribution hoses 22, may control the particulate material flow rate to multiple row units 16.

In the illustrated embodiment, the air cart 14 is towed behind the agricultural implement 12. For example, the agricultural implement 12 may be coupled to the work vehicle by a first hitch assembly, and the air cart 14 may be coupled to the agricultural implement 12 by a second hitch assembly 24. However, in other embodiments, the agricultural implement 12 may be towed behind the air cart 14. In further embodiments, the agricultural implement and the air cart may be part of a single unit that is towed behind a work vehicle, or the implement and the air cart may be elements of a self-propelled vehicle.

The air cart 14 may centrally store seeds and distribute the seeds to the row units. In the illustrated embodiment, the air cart 14 includes three primary product storage compartments 26, 28, and 30, a frame 32, and wheels 34. Further, the air cart 14 includes a secondary product storage compartment 36. The towing hitch 24 couples the tool frame 15 of the agricultural implement 12 to the air cart frame 32, which enables the air cart 14 to be towed with the agricultural implement 12. In addition, the secondary product storage compartment 36 includes a door 38 that selectively covers an inlet on the side of the secondary product storage compartment 36. The inlet enables particulate material to be deposited within the secondary product storage compartment 36. For example, to fill the secondary product storage compartment with particulate material, an operator may open the door 38, pour particulate material through the inlet, and close the door 38 to contain the particulate material within the secondary product storage compartment 36.

The primary product storage compartments 26, 28, and 30, and the secondary product storage compartment 36 may centrally store the particulate material (e.g., seeds, granular fertilizer, granular inoculant, etc.). For example, the primary product storage compartments 26, 28, and 30 may each include a single large storage compartment for storing a single particulate material. In certain embodiments, the primary product storage compartments 26, 28, and 30 may each store a different agricultural product. For example, the first primary product storage compartment 26 may store legume seeds, and the second primary product storage compartment 28 may store a dry fertilizer. Additionally, in this example, the secondary product storage compartment 36 may store granular inoculant, which is deposited into the soil in conjunction with the legume seeds and the dry fertilizer. The air cart 14 may deliver the seeds, fertilizer, and inoculant to the agricultural implement 12 via separate distribution hoses (e.g., three distribution hoses per row unit, three distribution hoses per header that supplies the particulate material to respective row units, etc.), or as a mixture through a single distribution hose (e.g., one distribution hose per row unit, one distribution hose per header that supplies the particulate material to respective row units, etc.).

Further, as illustrated, the secondary product storage compartment 36 is positioned beneath a portion of the first primary product storage compartment 26 and a portion of the second primary product storage compartment 28, and the secondary product storage compartment 36 may include storage for more than 15 bushels of particulate material. To improve storage capacity of the secondary product storage compartment 36, upper walls 41 of the secondary product storage compartment 36 have slopes that substantially correspond to respective slopes of bottom portions 43 of the first and second primary product storage compartments 26 and 28. Therefore, the shape of the secondary product storage compartment 36 enables the secondary product storage compartment 36 to utilize a substantial portion of the space between the first and second primary product storage compartments 26 and 28. In an alternative embodiment, the secondary product storage compartment 36 may be positioned between the second and third primary product storage compartments 28 and 30.

Figure 2:
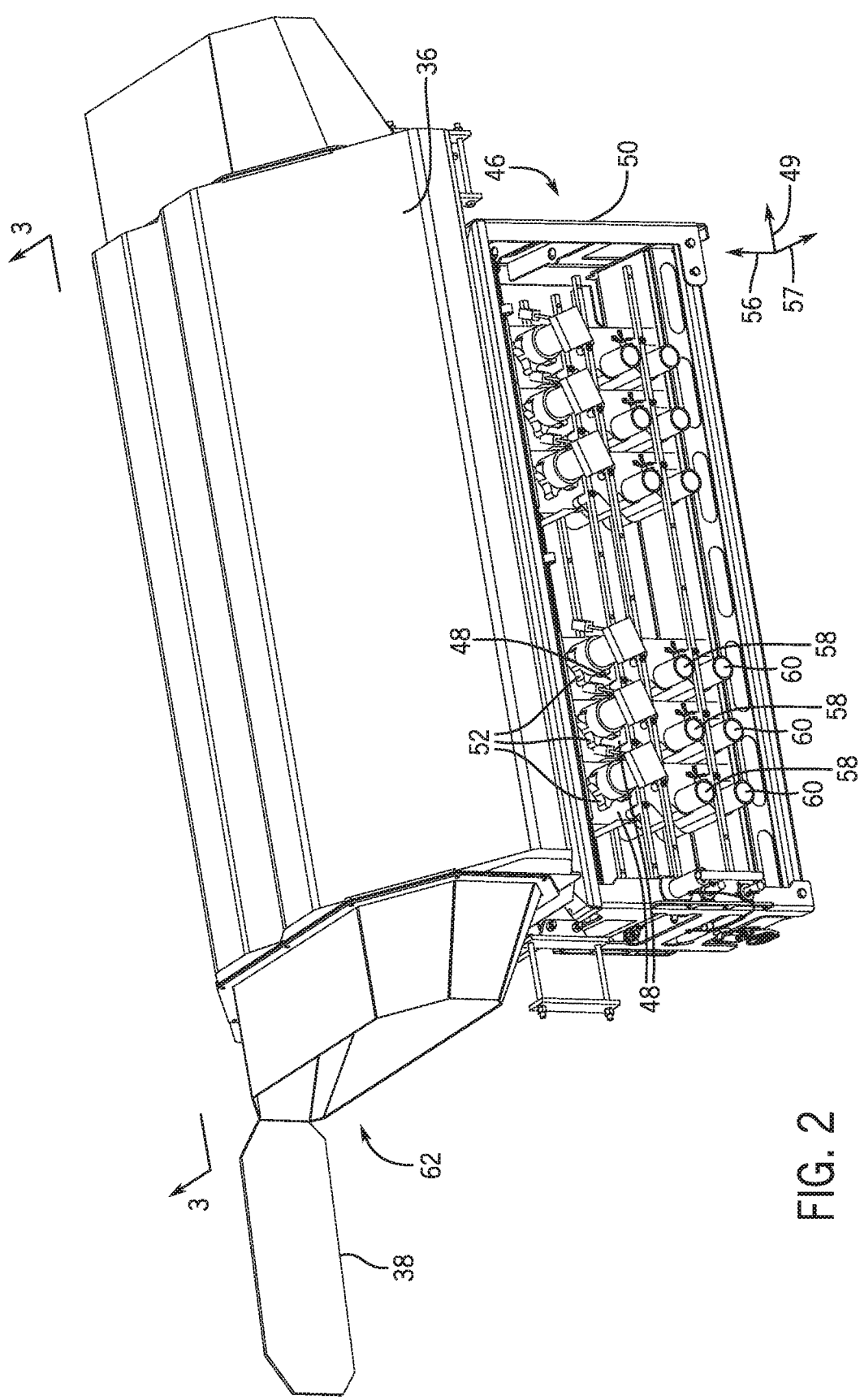
FIG. 2 is a perspective view of an embodiment of a secondary product storage compartment and an embodiment of a metering system that may be employed within the air art of FIG. 1.

FIG. 2 is a perspective view of an embodiment of a secondary product storage compartment 36 and an embodiment of a metering system 46 that may be employed within the air art of FIG. 1. The secondary product storage compartment 36 is configured to store particulate material and to provide the particulate material to the metering system 46. In the illustrated embodiment, the metering system 46 includes multiple seed meters 48 distributed along a lateral axis 49, in which the seed meters 48 are supported by a frame 50. While the illustrated metering system 46 includes six seed meters 48, in other embodiments, the metering system 46 may include 1, 2, 4, 6, 8, 10, 12, 14, or more seed meters 48. In the illustrated embodiment, each seed meter 48 includes at least one respective metering device 52 (e.g., meter roller) to control flow of particulate material to a respective conduit (e.g., distribution hose), which may provide the particulate material to a row unit or a header that distributes the particulate material to multiple row units. Each seed meter 48 also includes an inlet configured to receive the particulate material from the secondary product storage compartment (e.g., along a vertical axis 56). Each inlet extends along the lateral axis 49 and along a longitudinal axis 57.

Furthermore, each seed meter 48 includes a first conduit connector 58 and a second conduit connector 60. Each conduit connector 58, 60 is configured to receive air flow from the air source and the particulate material from the respective metering device 52, thereby producing the air/particulate material mixture, which flows to the row unit(s). First conduits (e.g., distribution hoses) may be coupled to the first conduit connectors 58, and second conduits (e.g., distribution hoses) may be coupled to the second conduit connectors 60. Furthermore, each seed meter 48 may include a gate that enables selection of the first conduit connector 58 or the second conduit connector 60. Once the first conduit connector 58 or the second conduit connector 60 is selected, particulate material flows through the selected conduit connector 58, 60 to the respective conduit (e.g., distribution hose) to the row unit(s).

In the illustrated embodiment, the secondary product storage compartment 36 has an inlet 62 on a lateral side of the secondary product storage compartment. The inlet 62 enables particulate material to be deposited within the secondary product storage compartment 36. In addition, the secondary product storage compartment 36 includes the door 38 (e.g., hatch) configured to selectively cover the inlet 62. For example, to load particulate material into the secondary product storage compartment, an operator may open the door 38, deposit particulate material into the secondary product storage compartment 36 through the inlet 62, and close the door 38 to block particulate material from flowing out of the secondary product storage compartment through the inlet. In certain embodiments, the door may include a latching assembly configured to secure the door in the closed position while the latching assembly is engaged and to enable the door to transition to the open position while the latching assembly is disengaged.

Furthermore, in certain embodiments, the air cart may include a hopper assembly coupled to the secondary product storage compartment and configured to provide particulate material to the inlet. For example, the hopper assembly may include an opening configured to receive the particulate material and a chute configured to direct the particulate material from the opening to the inlet of the secondary product storage compartment. In certain embodiments, the opening may be oriented substantially parallel to the soil surface. In such embodiments, the particulate material may be provided to the hopper assembly along the vertical axis, and the chute may direct the particulate material along the vertical axis and the lateral axis to the inlet of the secondary product storage compartment. In embodiments including the hopper, the door may be coupled to the hopper assembly and configured to selectively cover the opening.

Because the secondary product storage compartment is loaded from the side, particulate material may not effectively flow along the lateral axis 49 to facilitate filling the secondary product storage compartment. Accordingly, in certain embodiments, the air cart includes a distribution and leveling system configured to move the particulate material along the lateral axis 49 at least during loading of the secondary product storage compartment. For example, the distribution and leveling system may include an auger disposed within the secondary product storage compartment. The auger is configured to move the particulate material across the secondary product storage compartment (e.g., along the lateral axis away from the inlet) via rotation of the auger about a first rotational axis. In addition, the distribution and leveling system may include an agitator positioned below the auger, in which the agitator is configured to agitate the particulate material via rotation of the agitator about a second rotational axis. In certain embodiments, a first drive unit may drive the auger to rotate, and a second drive unit may drive the agitator to rotate. A controller may be communicatively coupled to the first and second drive units and configured to operate the drive units to control rotation of the auger and the agitator. As discussed in detail below, the controller may operate the drive units, such that the auger and the agitator move the particulate material along the lateral axis away from the inlet during loading of the secondary product storage compartment. As a result, the particulate material may be substantially evenly distributed along the lateral axis, thereby enabling the metering system to receive a substantially uniform supply of particulate material during operation of the metering system (e.g., after the loading process is complete).

Figure 3:
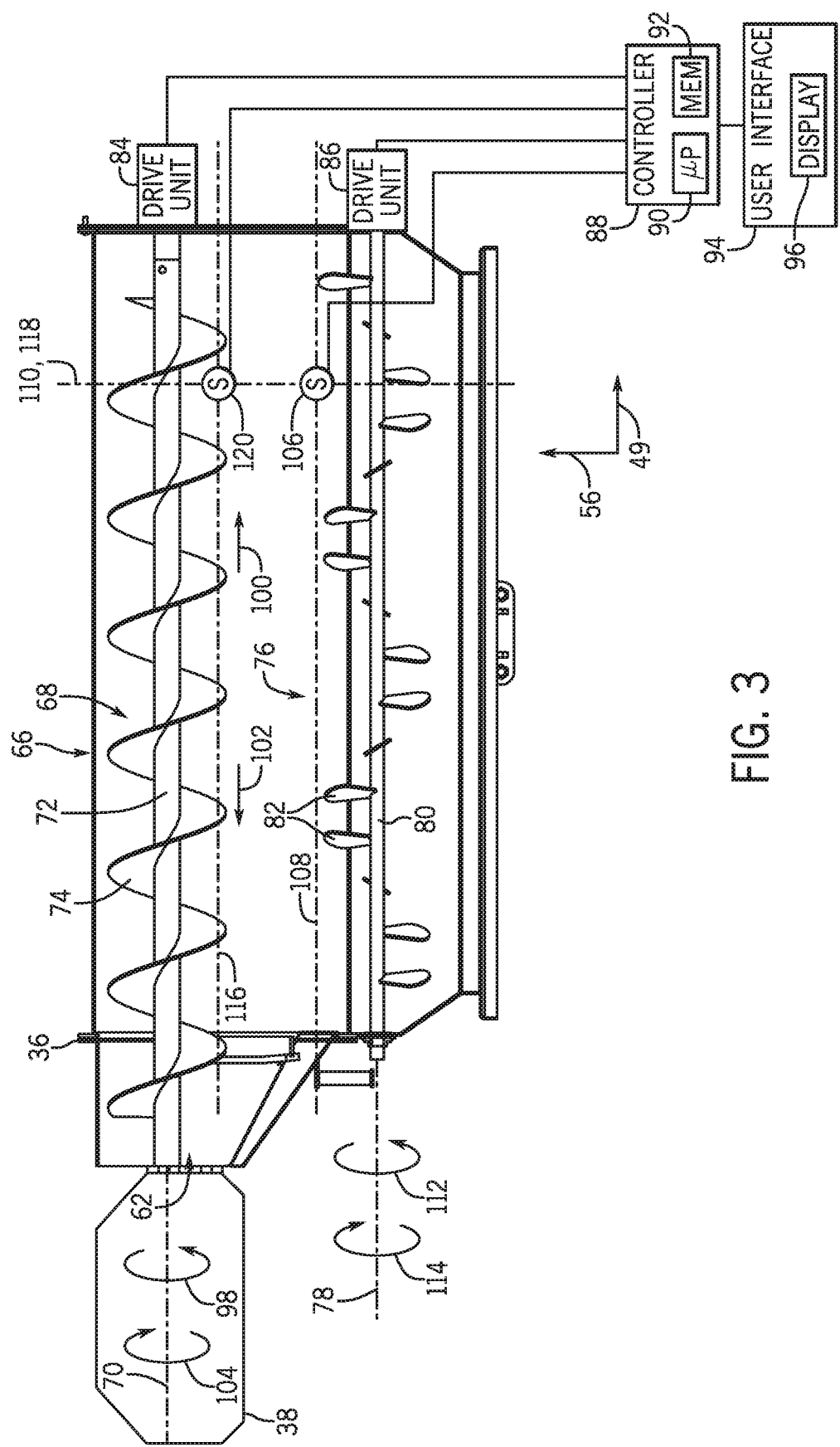
FIG. 3 is a cross-sectional view of the secondary product storage compartment of FIG. 2, taken along line 3-3 of FIG. 2, in which an embodiment of a distribution and leveling system is configured to move particulate material within the secondary product storage compartment.

FIG. 3 is a cross-sectional view of the secondary product storage compartment 36 of FIG. 2, taken along line 3-3 of FIG. 2, in which an embodiment of a distribution and leveling system 66 is configured to move particulate material within the secondary product storage compartment 36. In the illustrated embodiment, the distribution and leveling system 66 includes an auger 68 disposed within the secondary product storage compartment 36 (e.g., particulate material storage compartment). The auger 68 is configured to move particulate material across the secondary product storage compartment (e.g., along the lateral axis 49) via rotation of the auger 68 about a first rotational axis 70. In the illustrated embodiment, the auger 68 includes a shaft 72 and a spiral blade 74 extending along the shaft 72 (e.g., wrapping around the shaft 72 in a spiral pattern along the rotational axis 70). The pitch and/or diameter of the spiral blade may be particularly configured to move particulate material along the lateral axis 49 in response to rotation of the auger. For example, the pitch and the diameter of the spiral blade may be substantially constant along the length of the auger (e.g., extent of the auger along the rotational axis), as illustrated, or the pitch and/or the diameter of the spiral blade may vary along the length of the auger (e.g., extent of the auger along the rotational axis). While the auger includes a shaft and spiral blade in the illustrated embodiment, in other embodiments, the auger may have other and/or additional elements configured to move particulate material along the lateral axis 49 in response to rotation of the auger. For example, in certain embodiments, the auger may include multiple spiral blades separated from one another along the length of the shaft.

Furthermore, in the illustrated embodiment, the distribution and leveling system 66 includes an agitator 76 disposed within the secondary product storage compartment 36 and positioned below the auger 68 along the vertical axis 56. The agitator 76 is configured to agitate the particulate material within the secondary product storage compartment 36 via rotation of the agitator 76 about a second rotational axis 78. In the illustrated embodiment, the agitator includes a shaft 80 and multiple blades 82 extending from the shaft 80. For example, the blades 82 may extend from the shaft 80 in a spiral pattern along the rotational axis 78, as illustrated. The shape of the blades and/or the position/orientation of each blade along the shaft may be particularly configured to move the particulate material within the secondary product storage compartment and/or to break up clumps within the particulate material. While the agitator includes a shaft and blades extending from the shaft in the illustrated embodiment, in other embodiments, the agitator may include other and/or additional suitable elements configured to move particulate material (e.g., along the lateral axis 49) and/or break up particulate material clumps in response to rotation of the agitator. For example, the agitator may include a shaft and at least one coil coupled to the shaft and extending along the rotational axis in a spiral pattern.

In the illustrated embodiment, the first rotational axis 70 is substantially parallel to the second rotational axis 78. As used herein, "substantially parallel" refers to an angle between the rotational axes of less than 20 degrees, less than 15 degrees, less than 10 degrees, less than 5 degrees, less than 2 degrees, or less than 1 degree. In addition, the first rotational axis 70 and the second rotational axis 78 are substantially aligned with one another along the longitudinal axis. As used herein, "substantially aligned" refers to a longitudinal offset of less than about 10 percent, less than about 7 percent, less than about 5 percent, less than about 2 percent, or less than about 1 percent of the extent of the auger or the agitator along the lateral axis. The alignment and parallel orientation of the rotational axes enhance the flow of particulate material through the secondary product storage compartment along the lateral axis 49 (e.g., as compared to rotational axes that are not parallel to one another and/or are not aligned with one another along the longitudinal axis). Accordingly, upon completion of the loading process, the particulate material within the secondary product storage compartment may be evenly distributed, such that the inlet of each seed meter receives particulate material during operation of the metering system.

In the illustrated embodiment, the distribution and leveling system 66 includes a first drive unit 84 configured to drive the auger 68 to rotate, and the distribution and leveling system 66 includes a second drive unit 86 configured to drive the agitator 76 to rotate. Each drive unit may include any suitable device(s) configured to drive the auger/agitator in rotation. For example, in certain embodiments, each drive unit may include an electric motor, a pneumatic motor, a hydraulic motor, or a combination thereof. Because the auger and the agitator are each driven to rotate by a separate drive unit, rotation of the auger and rotation of the agitator are independently controllable, thereby enhancing control of the particulate material flow through the secondary product storage compartment. Furthermore, in certain embodiments, rotation of the auger and rotation of the agitator may be independently controlled by other suitable device(s). For example, the auger and the agitator may be driven to rotate by a single drive unit, and the rotational speed and/or the direction of rotation of the auger and/or the agitator may be controlled by rotation control device(s) (e.g., clutch, gearbox, etc.). However, in other embodiments, the auger and the agitator may be driven together (e.g., by a single drive unit), such that rotation of the auger and rotation of the agitator are not independently controllable.

In the illustrated embodiment, the distribution and leveling system 66 includes a controller 88 communicatively coupled to the first drive unit 84 and the second drive unit 86. The controller 88 is configured to operate the drive units to control rotation of the auger and the agitator. Accordingly, the controller 88 may independently control rotation of the auger and the agitator. In certain embodiments, the controller 88 is an electronic controller having electrical circuitry configured to output instructions to the first and second drive units. In the illustrated embodiment, the controller 88 includes a processor, such as the illustrated microprocessor 90, and a memory device 92. The controller 88 may also include one or more storage devices and/or other suitable components. The processor 90 may be used to execute software, such as software for controlling the drive units, and so forth. Moreover, the processor 90 may include multiple microprocessors, one or more "general-purpose" microprocessors, one or more special-purpose microprocessors, and/or one or more application specific integrated circuits (ASICS), or some combination thereof. For example, the processor 90 may include one or more reduced instruction set (RISC) processors.

The memory device 92 may include a volatile memory, such as random access memory (RAM), and/or a nonvolatile memory, such as read-only memory (ROM). The memory device 92 may store a variety of information and may be used for various purposes. For example, the memory device 92 may store processor-executable instructions (e.g., firmware or software) for the processor 90 to execute, such as instructions for controlling the drive units, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., a configuration of the auger, a configuration of the agitator, etc.), instructions (e.g., software or firmware for controlling the drive units, etc.), and any other suitable data.

In certain embodiments, the controller 88 is configured to instruct the first drive unit 84 to drive the auger 68 to rotate in response to receiving a signal indicative of filling the secondary product storage compartment 36 with particulate material. In the illustrated embodiment, the controller 88 is communicatively coupled to a user interface 94. The user interface 94 may output the signal to the controller 88 indicative of filling the secondary product storage compartment 36 with the particulate material. For example, to initiate a filling/loading process, an operator may open the door 38 and then provide an input to the user interface 94 indicative of filling the secondary product storage compartment. The input to the user interface 94 may include depressing a virtual button presented on a touch screen display 96, depressing a physical button on the user interface, flipping a switch on the user interface, etc. The user interface 94, in turn, may output the signal indicative of filling the secondary product storage compartment 36 with particulate material to the controller 88. The controller 88 may then operate the first drive unit 84 to drive the auger 68 in rotation. In certain embodiments, the user interface 94 may be positioned within a cab of a work vehicle and/or positioned proximate to the door 38 of the secondary product storage compartment 36, among other suitable locations.

Furthermore, while the signal indicative of filling the secondary product storage compartment with particulate material is received from the user interface in the illustrated embodiments, in other embodiments, the signal may be received from another suitable source, such as a sensor configured to output the signal indicative of filling the secondary product storage compartment in response to opening the door (e.g., such that the controller may automatically instruct the first drive unit to drive the auger to rotate in response to the operator opening the door to facilitate filling the secondary product storage compartment).

In the illustrated embodiment, the controller 88 is configured to instruct the first drive unit 84 to rotate the auger 68 in a first rotational direction 98 in response to receiving the signal indicative of filling the secondary product storage compartment. The auger 68 is configured to move the particulate material in a first lateral direction 100 (e.g., a first direction along the lateral axis 49) in response to rotation of the auger in the first rotational direction 98 (e.g., due to the configuration of the spiral blade 74). As illustrated, the first lateral direction 100 extends away from the inlet 62. Accordingly, rotating the auger 68 in the first rotational direction 98 drives the particulate material away from the inlet 62, thereby distributing the particulate material throughout the secondary product storage compartment along the lateral axis 49. However, in other embodiments, the auger may be configured to move the particulate material in a second lateral direction 102 (e.g., a second direction along the lateral axis 49) in response to rotation of the auger in the first rotational direction 98 (e.g., due to the configuration of the spiral blade 74). In such embodiments, the controller 88 may be configured to instruct the first drive unit 84 to rotate the auger 68 in a second rotational direction 104 in response to receiving the signal indicative of filling the secondary product storage compartment, such that the particular material moves away from the inlet 62 along the lateral axis 49.

Furthermore, in response to receiving the signal indicative of filling the secondary product storage compartment, the controller 88 may control/operate the agitator 76 in a product transfer mode to move the particulate material along the first lateral direction 100 during loading of the particulate material into the secondary product storage compartment. In certain embodiment, the controller 88 is configured to operate the agitator 76 in the product transfer mode while a signal indicative of the particulate material within the secondary product storage compartment exceeding a first threshold level at a first lateral position is not received. Accordingly, the agitator may work in conjunction with the auger to move the particulate material in the first lateral direction 100 during initial loading to the secondary product storage compartment. As used herein, "exceed" and "exceeding" refer to a condition in which the particulate material (e.g., the level of the particulate material) within the storage compartment is at or above a respective threshold level. If the particulate material does not exceed the respective threshold level, the particulate material (e.g., the level of the particulate material) within the storage compartment is below the respective threshold level.

In the illustrated embodiment, the distribution and leveling system 66 includes a first sensor 106 positioned at the first threshold level 108 and at the first lateral position 110 within the secondary product storage compartment 36. The first sensor 106 is configured to output a signal indicative of detection of the particulate material at the location of the first sensor 106. Accordingly, the first sensor 106 may not output the signal indicative of the particulate material within the secondary product storage compartment 36 exceeding the first threshold level 108 at the first lateral position 110 while the particulate material is not positioned at the first sensor 106, and the first sensor 106 may output the signal indicative of the particulate material within the secondary product storage compartment 36 exceeding the first threshold level 108 at the first lateral position 110 while the particulate material is positioned at the first sensor 106. The first sensor 106 may include any suitable sensor configured to detect presence of the particulate material at the location of the sensor. For example, the first sensor 106 may include an infrared sensor, an ultrasonic sensor, an electrostatic sensor, another suitable type of sensor, or a combination thereof. Additionally or alternatively, the distribution and leveling system may include another suitable sensor (e.g., a camera, a LIDAR sensor, etc.) positioned remote from the first threshold level and/or the first lateral position and configured to output the signal indicative of the particulate material within the secondary product storage compartment exceeding the first threshold level at the first lateral position.

In the illustrated embodiment, the first threshold level 108 is positioned such that the particulate material, while at the first threshold level 108, covers a substantial portion of the agitator 76 along the vertical axis 56 (e.g., 70 percent of the agitator 76, 80 percent of the agitator 76, 90 percent of the agitator 76, 100 percent of the agitator 76, etc.). In other embodiments, the first threshold level 108 is positioned above the agitator 76 along the vertical axis 56 (e.g., 10 percent above the agitator 76, 20 percent above the agitator 76, etc.). Furthermore, the first lateral position 110 is located at an opposite lateral end of the secondary product storage compartment from the inlet 62. Accordingly, the controller is configured to control the agitator in the product transfer mode at least until the particulate material covers a substantial portion of the agitator, thereby establishing a substantially even distribution of particulate material at the inlets of the seed meters.

While in the product transfer mode, the controller 88 is configured to instruct the second drive unit 86 to rotate the agitator 76 (e.g., operate the second drive unit 86 such that the agitator 76 is driven to rotate) in a first rotational direction 112. As a result, the agitator 76 drives the particulate material to move within the secondary product storage compartment 36 in the first lateral direction 100 toward the first lateral position 110 (e.g., due to the configuration of the blades 82). As previously discussed, the first lateral direction 100 extends away from the inlet 62. Accordingly, rotating the agitator 76 in the first rotational direction 112 moves the particulate material away from the inlet 62, thereby distributing the particulate material throughout the secondary product storage compartment along the lateral axis 49. However, in other embodiments, the agitator may be configured to drive the particulate material to move in the second lateral direction 102 in response to rotation of the agitator in the first rotational direction 112 (e.g., due to the configuration of the blades 82). In such embodiments, the controller 88 may be configured to instruct the second drive unit 86 to rotate the agitator 76 in a second rotational direction 114 while in the product transfer mode, such that the particular material moves away from the inlet 62 along the lateral axis 49 toward the first lateral position 110.

In certain embodiments, the controller 88 is configured to control/operate the agitator 76 in a leveling mode in response to receiving the signal (e.g., from the first sensor 106) indicative of the particulate material within the secondary product storage compartment exceeding the first threshold level 108 at the first lateral position 110. While in the leveling mode, the controller is configured to instruct the second drive unit 86 (e.g., operate the second drive unit 86) to alternatingly rotate the agitator in opposite rotational directions, thereby leveling the particulate material within the secondary product storage compartment 36. As a result, the level of the particulate material at the inlets to the seed meters may be substantially maintained during the loading process. Operating the agitator 76 in the leveling mode may include instructing the second drive unit 86 to rotate the agitator 76 in the first rotational direction 112 for a first active time, instructing the second drive unit 86 to terminate rotation of the agitator 76 for a dwell time, instructing the second drive unit 86 to rotate the agitator 76 in the second rotational direction 114 for a second active time (e.g., equal to the first active time or different than the first active time), and then instructing the second drive unit 86 to terminate rotation of the agitator 76 for the dwell time. This process may be repeated throughout operation of the agitator in the leveling mode. However, the controller may be configured to operate the second drive unit in other sequences in other embodiments.

In certain embodiments, the controller 88 is configured to instruct the first drive unit 84 to terminate rotation of the auger 68 in response to receiving a signal indicative of the particulate material within the secondary product storage compartment exceeding a second threshold level 116 at a second lateral position 118. Accordingly, the controller 88 may instruct the agitator to stop moving particulate material in the first lateral direction 100 when the secondary product storage compartment is substantially full. As a result, the torque on the auger 68 may be limited (e.g., as compared to operating the auger within a substantially full storage compartment).

In the illustrated embodiment, the distribution and leveling system 66 includes a second sensor 120 positioned at the second threshold level 116 and at the second lateral position 118 within the secondary product storage compartment 36. The second sensor 120 is configured to output a signal indicative of detection of the particulate material at the location of the second sensor 120. Accordingly, the second sensor 120 may not output the signal indicative of the particulate material within the secondary product storage compartment 36 exceeding the second threshold level 116 at the second lateral position 118 while the particulate material is not positioned at the second sensor 120, and the second sensor 120 may output the signal indicative of the particulate material within the secondary product storage compartment 36 exceeding the second threshold level 116 at the second lateral position 118 while the particulate material is positioned at the second sensor 120. The second sensor 120 may include any suitable sensor configured to detect presence of the particulate material at the location of the sensor. For example, the second sensor 120 may include an infrared sensor, an ultrasonic sensor, an electrostatic sensor, another suitable type of sensor, or a combination thereof. Additionally or alternatively, the distribution and leveling system may include another suitable sensor (e.g., a camera, a LIDAR sensor, etc.) positioned remote from the second threshold level and/or the second lateral position and configured to output the signal indicative of the particulate material within the secondary product storage compartment exceeding the second threshold level at the second lateral position.

In the illustrated embodiment, the second threshold level 116 is positioned such that the particulate material, while at the second threshold level 116, at least partially engages the auger 68. In other embodiments, the second threshold level may be positioned above or below the illustrated second threshold level 116 along the vertical axis 56. Furthermore, the second lateral position 118 is located at the opposite lateral end of the secondary product storage compartment from the inlet 62 (e.g., at the same location as the first lateral position 110). Accordingly, the controller is configured to drive the auger to rotate until the particulate material fills a substantial portion of the secondary product storage compartment 36.

In certain embodiments, the controller 88 is configured to instruct the second drive unit 86 to terminate rotation of the agitator in response to receiving the signal indicative of the particulate material within the secondary product storage compartment exceeding the second threshold level at the second lateral position. However, in other embodiments, the controller may continue to operate the agitator in the leveling mode (e.g., after the loading process is complete and the metering system is in operation) regardless of the level of the particulate material within the secondary product storage compartment (e.g., at least until the level drops below a minimum fill level, such as when the storage compartment is substantially empty). For example, the controller may operator the agitator in the leveling mode during operation of the metering system, such that a substantially even level of particulate material is maintained at the inlets to the seed meters, thereby substantially reducing or eliminating the possibility of interruption to the particulate material flow at the seed meters (e.g., at least while the particulate material level is above the minimum fill level).

While the illustrated distribution and leveling system includes one auger and one agitator, in other embodiments, the distribution and leveling system may include additional auger(s) and/or agitator(s) (e.g., positioned in suitable location(s) within the secondary product storage compartment). While the distribution and leveling system is configured to move particulate material within the secondary product storage compartment in the illustrated embodiment, in other embodiments, the distribution and leveling system may be configured to move particulate material within a primary product storage compartment and/or another suitable storage compartment. For example, in certain embodiments, an auger and/or an agitator may be disposed within at least one primary product storage compartment.

Figure 4:
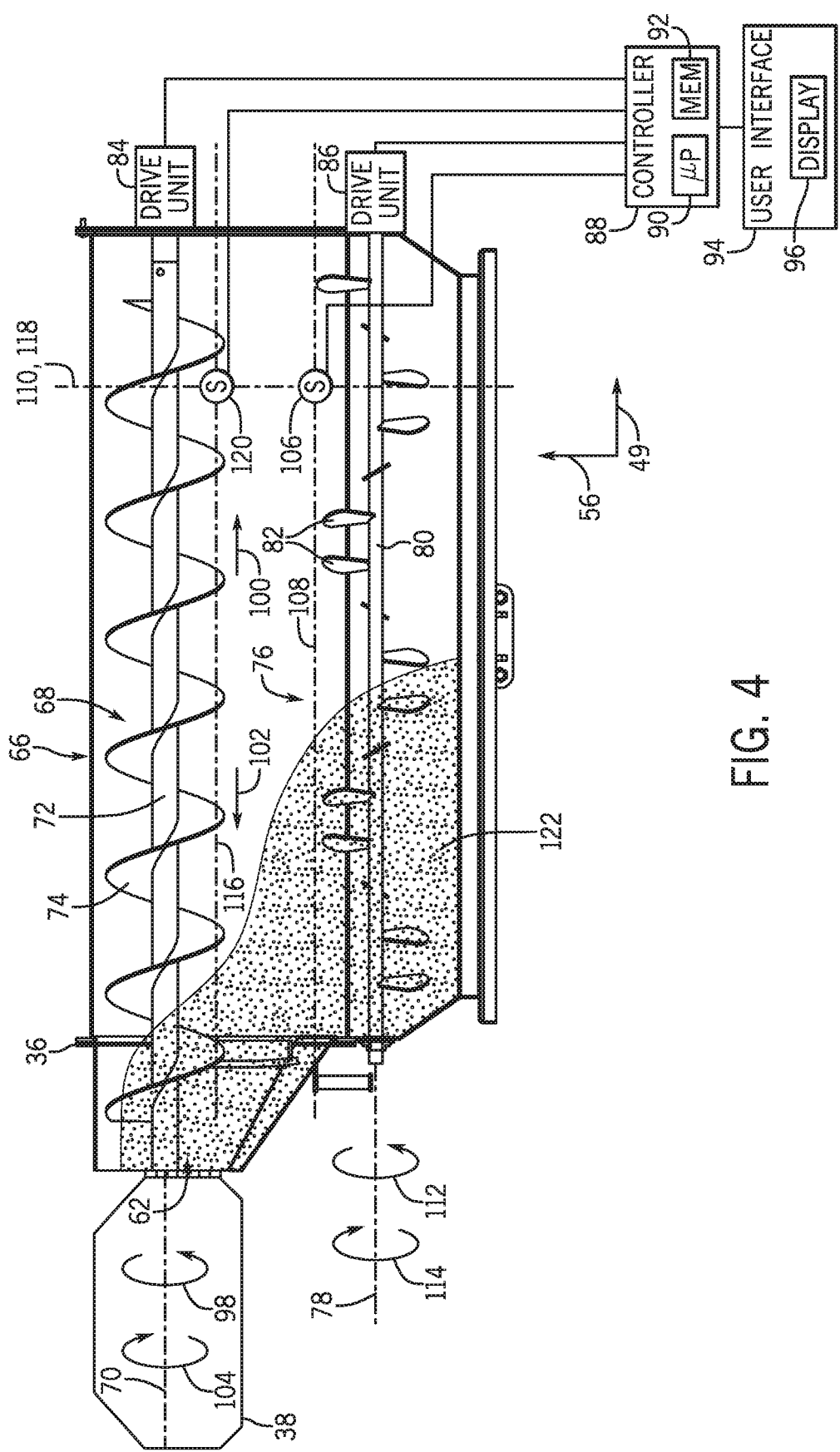
FIG. 4 is a cross-sectional view of the secondary product storage compartment of FIG. 2, in which particulate material is below a first threshold level.

FIG. 4 is a cross-sectional view of the secondary product storage compartment 36 of FIG. 2, in which particulate material 122 is below the first threshold level 108 at the first lateral position 110. Accordingly, the first sensor 106 may not output the signal indicative of the particulate material within the secondary product storage compartment 36 exceeding the first threshold level 108 at the first lateral position 110. In addition, the second sensor 120 may not output the signal indicative of the particulate material within the secondary product storage compartment 36 exceeding the second threshold level 116 at the second lateral position 118. As such, during a loading operation of the secondary product storage compartment 36 (e.g., while the door 38 is open, particulate material is being delivered through the inlet 62, and a signal indicative of filling the secondary product storage compartment 36 with particulate material is received), the controller 88 may instruct the first drive unit 84 to rotate the auger 68 (e.g., in the first rotational direction 98) to move the particulate material 122 in the first lateral direction 100. In addition, the controller 88 may control/operate the agitator 76 in the product transfer mode (e.g., because the particulate material 122 is below the first threshold level 108 at the first lateral position 110). While in the product transfer mode, the controller 88 may instruct the second drive unit 86 to rotate the agitator 76 (e.g., in the first rotational direction 112) to move the particulate material 122 in the first lateral direction 100. As a result, the particulate material 122 may be distributed throughout the secondary product storage compartment 36 along the lateral axis 49 as the secondary product storage compartment 36 is filled with the particulate material 122.

Figure 5:
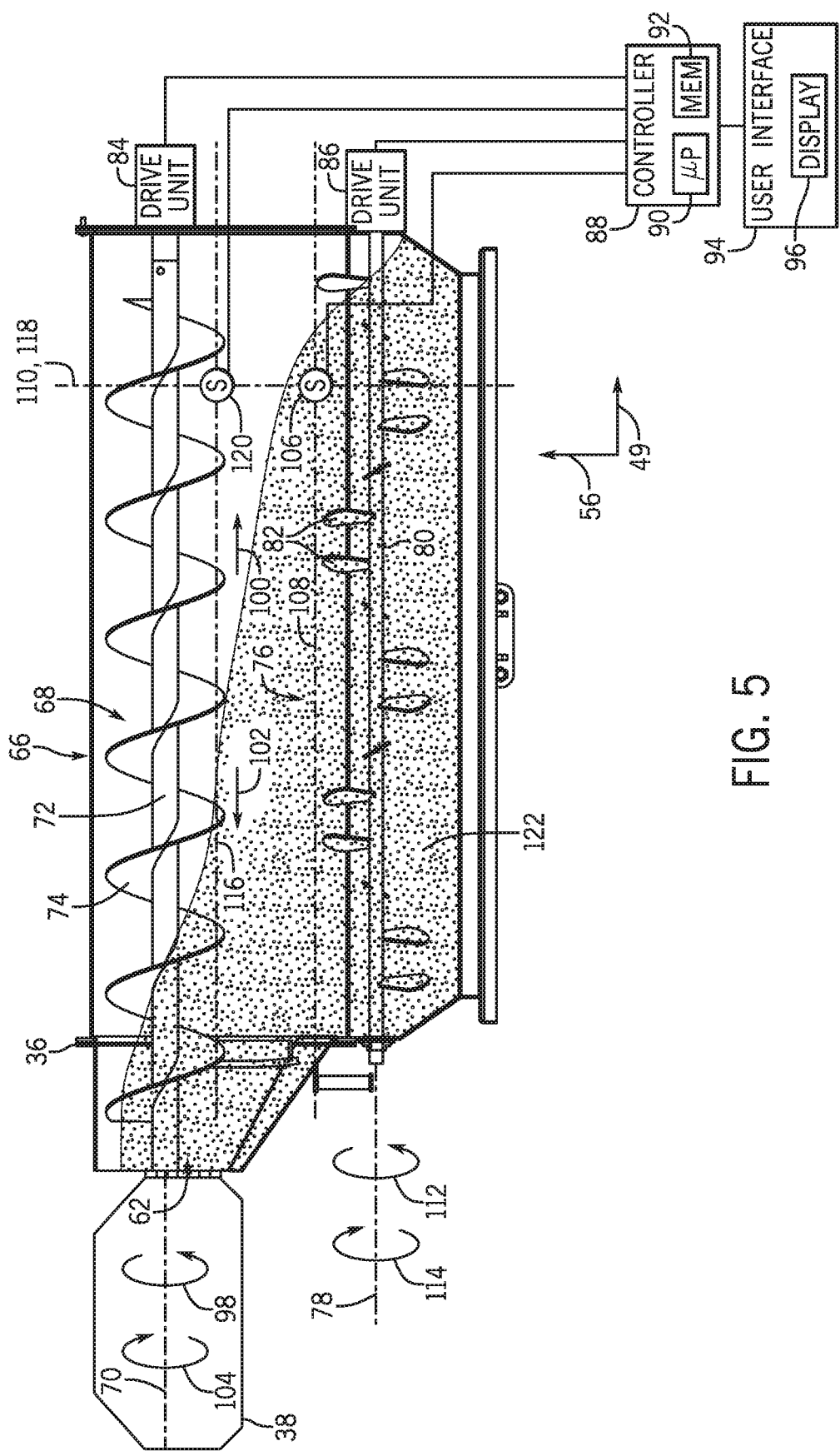
FIG. 5 is a cross-sectional view of the secondary product storage compartment of FIG. 2, in which the particulate material exceeds the first threshold level and is below a second threshold level.

FIG. 5 is a cross-sectional view of the secondary product storage compartment 36 of FIG. 2, in which the particulate material 122 is above the first threshold level 108 at the first lateral position 110 and below the second threshold level 116 at the second lateral position 118. Accordingly, the first sensor 106 may output the signal indicative of the particulate material within the secondary product storage compartment 36 exceeding the first threshold level 108 at the first lateral position 110. In addition, the second sensor 120 may not output the signal indicative of the particulate material within the secondary product storage compartment 36 exceeding the second threshold level 116 at the second lateral position 118. As such, during a loading operation of the secondary product storage compartment 36 (e.g., while the door 38 is open, particulate material is being delivered through the inlet 62, and the signal indicative of filling the secondary product storage compartment 36 with particulate material is received), the controller 88 may instruct the first drive unit 84 to rotate the auger 68 (e.g., in the first rotational direction 98) to move the particulate material 122 in the first lateral direction 100. In addition, the controller 88 may control/operate the agitator 76 in the leveling mode (e.g., because the particulate material 122 is above the first threshold level 108 at the first lateral position 110). While in the leveling mode, the controller 88 may instruct the second drive unit 86 to alternatingly rotate the agitator 76 in opposite rotational directions, thereby leveling the particulate material 122 within the secondary product storage compartment 36. As a result, the level of the particulate material at the inlets to the seed meters may be substantially maintained during the loading process.

Figure 6:
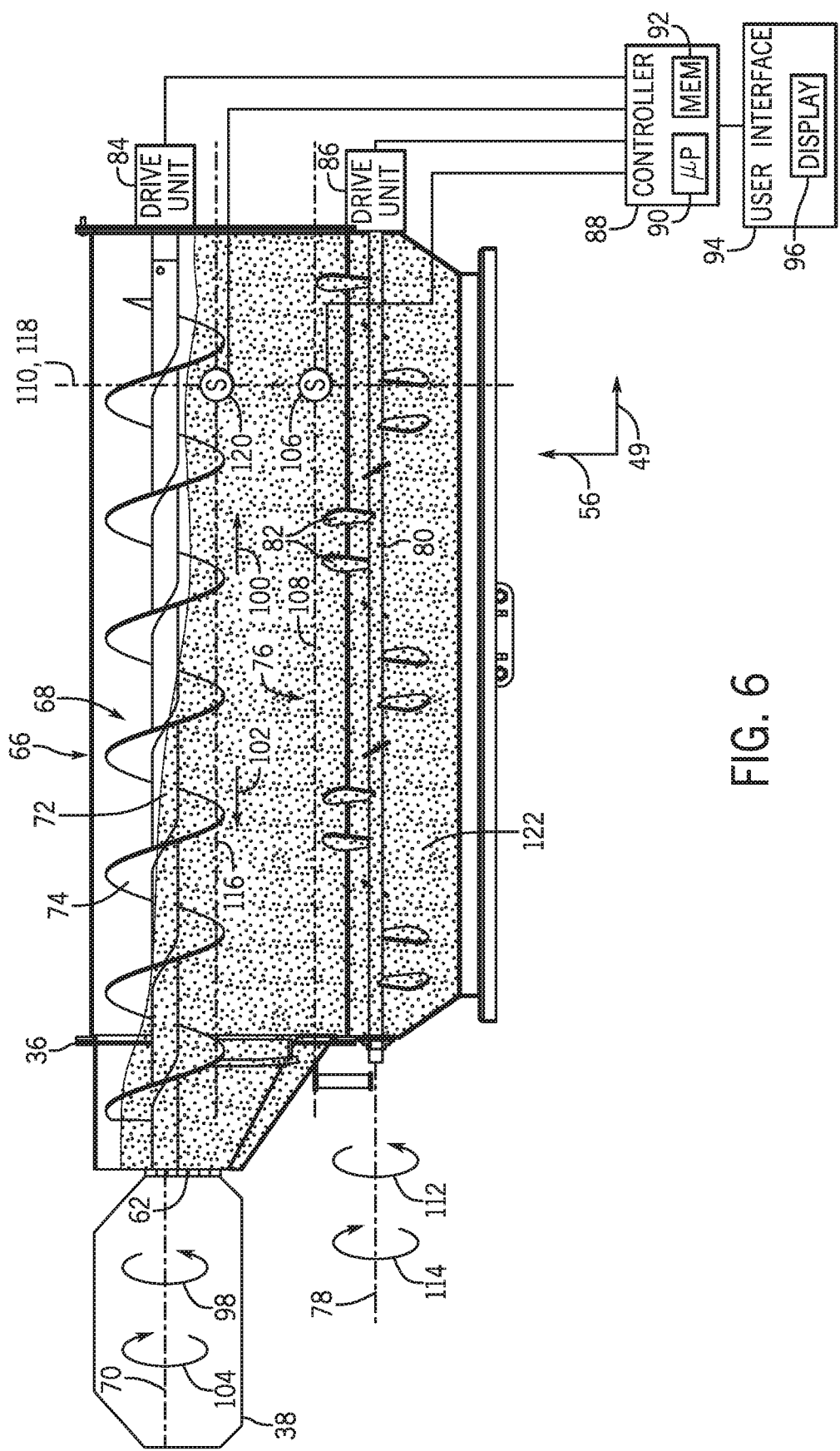
FIG. 6 is a cross-sectional view of the secondary product storage compartment of FIG. 2, in which the particulate material exceeds the second threshold level.

FIG. 6 is a cross-sectional view of the secondary product storage compartment 36 of FIG. 2, in which the particulate material 122 is above the second threshold level 116 at the second lateral position 118. Accordingly, the first sensor 106 may output the signal indicative of the particulate material within the secondary product storage compartment 36 exceeding the first threshold level 108 at the first lateral position 110. In addition, the second sensor 120 may output the signal indicative of the particulate material within the secondary product storage compartment 36 exceeding the second threshold level 116 at the second lateral position 118. In response to the particulate material 122 within the secondary product storage compartment 36 exceeding the second threshold level 116 at the second lateral position 118, the controller 88 may instruct the first drive unit 84 to terminate rotation of the auger 68 (e.g., stop rotation of the auger 68, stop driving the auger 68 to rotate, etc.). In addition, in certain embodiments, the controller 88 may output a signal to the user interface 94 indicative of instructions to provide an indication (e.g., visual indication on the display 96, audible indication, etc.) that the secondary product storage compartment 36 is substantially full.

In certain embodiments, the controller 88 may control/operate the agitator 76 in an agitation mode in response to the particulate material 122 within the secondary product storage compartment 36 exceeding the second threshold level 116 at the second lateral position 118 (e.g., while the metering system is in operation). While in the agitation mode, the controller 88 may instruct the second drive unit 86 to rotate the agitator 76 in the first rotational direction 112 for an active time, to terminate rotation of the agitator 76 for a dwell time, to rotate the agitator 76 in the second rotational direction 114 for the active time, and then to terminate rotation of the agitator 76 for the dwell time. This process may be repeated while operating in the agitation mode. Operating the agitator 76 in the agitation mode may break up clumps of the particulate material 122, thereby promoting flow of the particulate material to the seed meters while the metering system is in operation (e.g., after the loading operation is complete, the door 38 is closed, and the metering system is activated).

Figure 7:
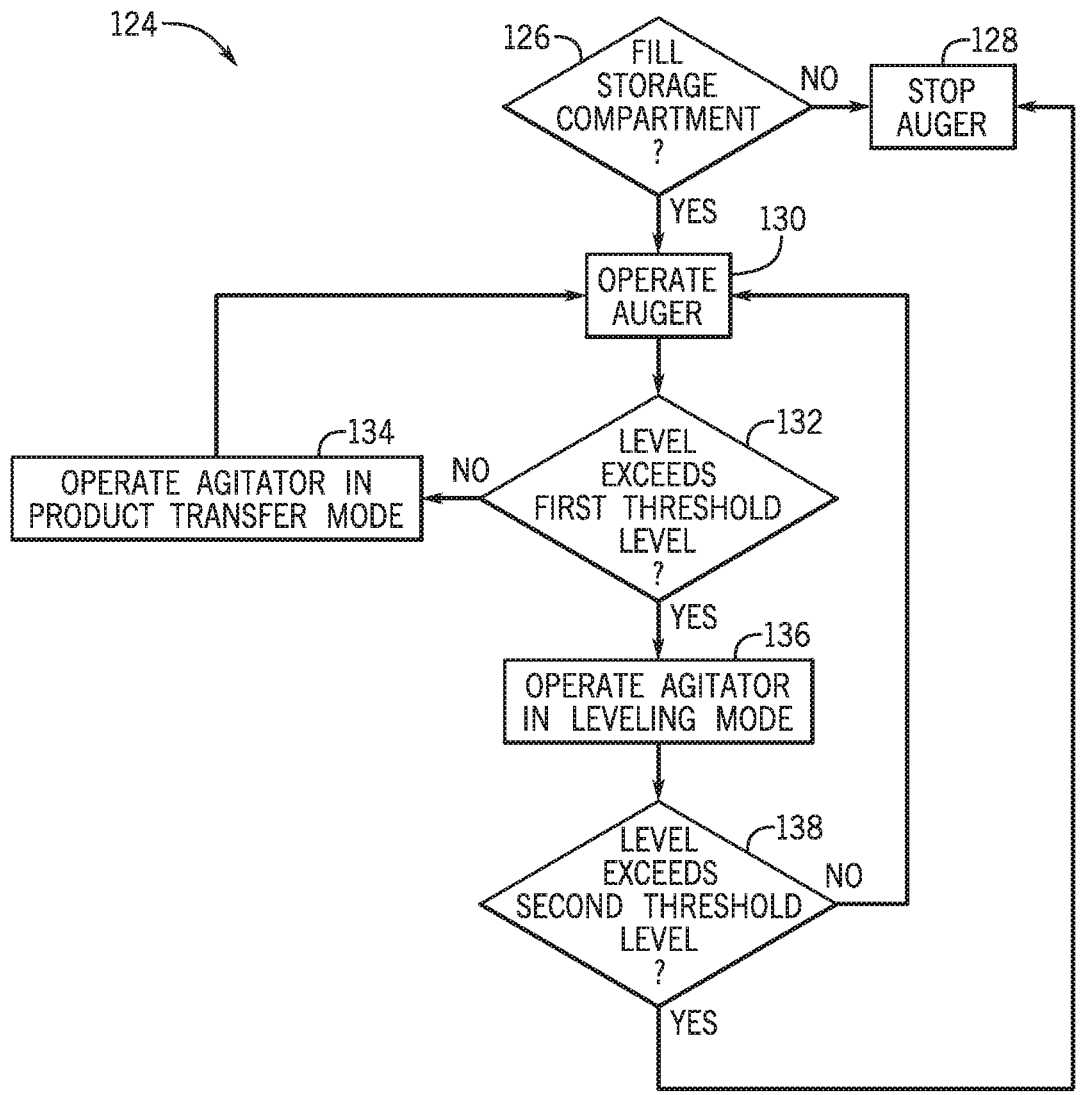
FIG. 7 is a flow chart of an embodiment of a method of operating a distribution and leveling system.

FIG. 7 is a flow chart of an embodiment of a method 124 of operating a distribution and leveling system. First, as represented by block 126, a determination is made regarding whether to fill the storage compartment (e.g., the secondary product storage compartment). For example, a determination may be made regarding whether a signal indicative of filling the storage compartment is received (e.g., from a user interface). If filling the storage compartment is not desired (e.g., the signal indicative of filling the storage compartment is not received), the auger may be stopped (e.g., the first drive unit may be instructed to stop/terminate rotation of the auger), as represented by block 128. However, if filling the storage compartment is desired (e.g., the signal indicative of filling the storage compartment is received), the auger may be operated (e.g., driven to rotate), as represented by block 130.

Next, as represented by block 132, a determination is made regarding whether the particulate material within the storage compartment exceeds the first threshold level at the first lateral position. For example, a determination may be made regarding whether a signal from the first sensor indicative of detection of the particulate material at the first sensor is received, in which the first sensor is positioned at the first threshold level and at the first lateral position within the storage compartment. If the particulate material within the storage compartment does not exceed the first threshold level at the first lateral position (e.g., the signal from the first sensor is not received), the agitator is operated in the product transfer mode, as represented by block 134. For example, while operating in the product transfer mode, the second drive unit may be instructed to rotate the agitator in a direction configured to move the particulate material toward the first lateral position. However, if the particulate material within the storage compartment exceed the first threshold level at the first lateral position (e.g., the signal from the first sensor is received), the agitator may be operated in the leveling mode, as represented by block 136. For example, while operating the leveling mode, the second drive unit may be instructed to alternatingly rotate the agitator in opposite directions.

Next, as represented by block 138, a determination is made regarding whether the particulate material within the storage compartment exceeds the second threshold level at the second lateral position. For example, a determination may be made regarding whether a signal from the second sensor indicative of detection of the particulate material at the second sensor is received, in which the second sensor is positioned at the second threshold level and at the second lateral position within the storage compartment. If the particulate material within the storage compartment exceeds the second threshold level at the second lateral position (e.g., the signal from the second sensor is received), the auger may be stopped (e.g., the first drive unit may be instructed to stop/terminate rotation of the auger), as represented by block 128. However, if the particulate material within the storage compartment does not exceed the second threshold level at the second lateral position, the auger may be operated (e.g., driven to rotate), as represented by block 130. Furthermore, in certain embodiments, the agitator may be operated in the agitation mode in response to the particulate material within the storage compartment exceeding the second threshold level at the second lateral position (e.g., while the metering system is in operation). For example, while operating in the agitation mode, the second drive unit may be instructed to rotate the agitator in the first rotational direction for an active time, terminate rotation of the agitator for a dwell time, rotate the agitator in the second rotational direction for the active time, and then terminate rotation of the agitator for the dwell time. This process may be repeated while operating in the agitation mode.

The method 124 disclosed above may be performed by any suitable device or combination of devices, such as the controller described above with referenced to FIG. 3. For example, the steps of the method 124 may be stored within the memory device of the controller and executed by the processor of the controller. Furthermore, in certain embodiments, the steps of the method 124 may be performed in the order disclosed above. However, in other embodiments, the steps of the method may be performed in any other suitable order. In addition, while one method of operating the auger and the agitator is disclosed above, the auger and the agitator may be operated according to any suitable method.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A distribution and leveling system for a particulate material storage compartment, comprising:
an auger configured to be disposed within the particulate material storage compartment, wherein the auger is configured to receive particulate material from an inlet on a lateral side of the particulate material storage compartment, and the auger is configured to move the particulate material laterally across the particulate material storage compartment via rotation of the auger about a first rotational axis to facilitate distribution of the particulate material laterally along a plurality of seed meter inlets positioned to receive the particulate material from the particulate material storage compartment along a vertical axis; and
an agitator positioned below the auger, wherein the agitator is configured to agitate the particulate material via rotation of the agitator about a second rotational axis;
wherein the first rotational axis is substantially parallel to the second rotational axis, rotation of the auger and rotation of the agitator are independently controllable, and the first rotational axis and the second rotational axis are substantially aligned with one another along a longitudinal axis of the particulate material storage compartment.

2. The distribution and leveling system of claim 1, comprising a first drive motor configured to drive the auger to rotate, and a second drive motor configured to drive the agitator to rotate.

3. The distribution and leveling system of claim 1, wherein the auger comprises a shaft and a spiral blade extending along the shaft.

4. The distribution and leveling system of claim 1, wherein the agitator comprises a shaft and a plurality of blades extending from the shaft.

5. A distribution and leveling system for a particulate material storage compartment, comprising:

a first drive unit configured to drive an auger to rotate about a first rotational axis to move particulate material across the particulate material storage compartment;
a second drive unit configured to drive an agitator to rotate about a second rotational axis to agitate the particulate material; and
a controller comprising a processor and a memory, wherein the controller is communicatively coupled to the first drive unit and to the second drive unit, the controller is configured to independently control rotation of the auger and the agitator, and the controller is configured to control the agitator in a product transfer mode while a signal indicative of the particulate material within the particulate material storage compartment exceeding a first threshold level at a first lateral position is not received.

6. The distribution and leveling system of claim 5, wherein the controller is configured to instruct the first drive unit to drive the auger to rotate in response to receiving a signal indicative of filling the particulate material storage compartment with the particulate material.

7. The distribution and leveling system of claim 5, wherein the controller is configured to control the agitator in a leveling mode in response to receiving the signal indicative of the particulate material within the particulate material storage compartment exceeding the first threshold level at the first lateral position.

8. The distribution and leveling system of claim 7, wherein the controller is configured to instruct the second drive unit to rotate the agitator in a rotational direction configured to move the particulate material toward the first lateral position while in the product transfer mode, and the controller is configured to instruct the second drive unit to alternatingly rotate the agitator in opposite rotational directions while in the leveling mode.

9. The distribution and leveling system of claim 5, wherein the first lateral position is located at an opposite lateral end of the particulate material storage compartment from an inlet of the particulate material storage compartment.

10. The distribution and leveling system of claim 5, wherein the controller is configured to instruct the first drive unit to terminate rotation of the auger in response to receiving a signal indicative of the particulate material within the particulate material storage compartment exceeding a second threshold level at a second lateral position.

11. The distribution and leveling system of claim 10, wherein the second lateral position is located at an opposite lateral end of the particulate material storage compartment from an inlet of the particulate material storage compartment.

12. A distribution and leveling system for a particulate material storage compartment, comprising:
an auger configured to be disposed within the particulate material storage compartment, wherein the auger is configured to receive particulate material from an inlet on a lateral side of the particulate material storage compartment, and the auger is configured to move the particulate material laterally across the particulate material storage compartment via rotation of the auger about a first rotational axis to facilitate distribution of the particulate material laterally along a plurality of seed meter inlets positioned to receive the particulate material from the particulate material storage compartment along a vertical axis;
a first drive motor configured to drive the auger to rotate;

an agitator positioned below the auger, wherein the agitator is configured to agitate the particulate material via rotation of the agitator about a second rotational axis;

a second drive motor configured to drive the agitator to rotate; and a controller comprising a processor and a memory, wherein the controller is communicatively coupled to the first drive motor and to the second drive motor, and the controller is configured to independently control rotation of the auger and the agitator.

13. The distribution and leveling system of claim 12, wherein the first rotational axis is substantially parallel to the second rotational axis.

14. The distribution and leveling system of claim 12, wherein the first rotational axis and the second rotational axis are substantially aligned within one another along a longitudinal axis of the particulate material storage compartment.

15. The distribution and leveling system of claim 12, wherein the controller is configured to instruct the first drive motor to drive the auger to rotate in response to receiving a signal indicative of filling the particulate material storage compartment with the particulate material.

16. The distribution and leveling system of claim 12, wherein the controller is configured to control the agitator in a product transfer mode while a signal indicative of the particulate material within the particulate material storage compartment exceeding a threshold level at a lateral position is not received.

17. The distribution and leveling system of claim 12, wherein the controller is configured to control the agitator in a leveling mode in response to receiving a signal indicative of the particulate material within the particulate material storage compartment exceeding a threshold level at a lateral position.

18. The distribution and leveling system of claim 12, wherein the controller is configured to instruct the first drive motor to terminate rotation of the auger in response to receiving a signal indicative of the particulate material within the particulate material storage compartment exceeding a threshold level at a lateral position.

19. The distribution and leveling system of claim 18, wherein the lateral position is located at an opposite lateral end of the particulate material storage compartment from the inlet of the particulate material storage compartment.

* * * * *